United States Patent [19]
Chiasson et al.

[11] Patent Number: 5,546,429
[45] Date of Patent: Aug. 13, 1996

[54] FREQUENCY HOPPING CODE DIVISION MULTIPLE ACCESS RADIO COMMUNICATION UNIT

[75] Inventors: Gregory M. Chiasson, Barrington; Phillip D. Rasky, Buffalo Grove; Kevin L. Baum, Hoffman Estates, all of Ill.

[73] Assignee: Motorola, Inc., Schamburg, Ill.

[21] Appl. No.: 973,352

[22] Filed: Nov. 9, 1992

[51] Int. Cl.$^6$ ............................................. H04L 27/06
[52] U.S. Cl. ......................... 375/341; 375/343; 375/347; 455/137
[58] Field of Search .................. 375/94, 100, 39, 375/341, 343, 347, 262, 267, 202, 205; 455/136, 137, 138, 135

[56] References Cited

U.S. PATENT DOCUMENTS

| | | | |
|---|---|---|---|
| 3,803,361 | 4/1974 | Nugent | 375/56 |
| 4,253,193 | 2/1981 | Kennard et al. | 455/137 |
| 4,748,682 | 5/1988 | Fukae et al. | 375/100 |
| 4,910,752 | 3/1990 | Yester, Jr. et al. | 375/94 |
| 5,031,193 | 7/1991 | Atkinson et al. | 375/100 |
| 5,063,574 | 11/1991 | Moose | 375/27 |
| 5,121,408 | 6/1992 | Cai et al. | 375/100 |
| 5,127,025 | 6/1992 | Oksnoue | 455/135 |
| 5,142,551 | 8/1992 | Borth et al. | 375/12 |
| 5,175,749 | 12/1992 | Ficht et al. | 375/94 |
| 5,214,675 | 5/1993 | Mueller et al. | 375/100 |
| 5,373,536 | 12/1994 | Dehner, Jr. et al. | 375/106 |

OTHER PUBLICATIONS

Parsons, Jr., Raymond D., "Polar Quantilizing for Coded PSK Transmission", IEEE Transactions on Communication, vol. 38, No. 9, Sep. 1990, pp. 1511–1519.

Ariyavisitakul, Sirikiat, "Equalization of a Hard-Limited Slowly-Fading Multipath Signal Using a Phase Equalizer with Time-Reversal Structure, "IEEE Journal on Selected Areas in Communication, vol. 10, No. 3, Apr. 1992, pp. 589–598.

Bellcore, Generic Criteria for Version 0.1 Wireless Access Communications Systems ( WACS), Technical Advisory, TA–NWT–001313, Issue 1 Jul. 1992.

*Primary Examiner*—Stephen Chin
*Assistant Examiner*—Timothy J. May
*Attorney, Agent, or Firm*—Richard A. Sonnentag

[57] ABSTRACT

A radio communication unit for a digital communication system is provided in which an input information signal is protected from transmission errors by forward error correction encoding the information signal. In addition, the communication unit enhances subsequent processing of a transmitted form of the information signal by a hard-limiting receiver by inserting a predetermined synchronization sequence into the information signal. Further, a corresponding radio communication unit is provided which includes a hard limiting mechanism for removing the magnitude of each sample in a group of data samples of a signal received from over a radio communication channel. In addition, weighting coefficients of the hard-limited group of data samples for maximum likelihood decoding and diversity combining are generated by comparing the hard-limited group of data samples to a known predetermined synchronization sequence. Finally, estimated information samples are generated, utilizing the weighting coefficients, by maximum-likelihood decoding the group of data samples.

17 Claims, 2 Drawing Sheets

FREQUENCY HOPPING CODE DIVISION MULTIPLE ACCESS RADIO COMMUNICATION UNIT

RELATED INVENTIONS

The present invention is related to the following inventions which are assigned to the assignee of the present invention:

Dual Mode Communication Network by Morton Stern et al. having U.S. Ser. No. 07/906,785, and filed on Jun. 30, 1992.

Method Of Registering/Reassigning A Call In A Dual Mode Communication Network by Borth et al. having U.S. Ser. No. 07/957,122, and filed on Oct. 7, 1992.

FIELD OF THE INVENTION

The present invention relates to radio communication systems and, more particularly, to a frequency hopping code division multiple access radio communication unit.

BACKGROUND OF THE INVENTION

Cellular radio communication systems typically include a number of central communication base sites. Each central communication site has a service area coverage for servicing mobile communication units within the service area. The service areas typically are arranged such that adjacent remote base site service coverage areas overlap in a manner that provides a substantially continuous service region. The substantially continuous service region provides uninterrupted service by handing off mobile communication units from one base site serving a service area to an adjacent base site serving another service area.

Pedestrian as well as mobile users will typically access the same cellular radio communication systems. For purposes of this discussion, a pedestrian user is one who roams slowly (10 kph, kilometers per hour, or less) as opposed to a mobile user (up to 100 kph or more) user. However, these cellular communication systems are typically designed to provide adequate performance for the worst case environment (i.e., the mobile user). As such, the cellular radio communication systems typically provide continual overhead measurements used by the system to maintain channel quality or perform hand-off functions. Since these measurements require the same amount of processing whether a user is a mobile user or a pedestrian user, the pedestrian user is charged the same fee for using their cellular phone as the user who is a mobile user.

Therefore, them exists a need in the industry for a personal communication system (PCS) which would provide a low-tier system for pedestrian users at a reduced cost. The low-tier system would provide access via radio frequency (RF) link to a basic cellular network which may or may not provide hand-off capability between low-tier service areas. In addition, a high-tier system should be provided for the mobile user. This high-tier system would have many of the features found in current cellular systems including hand-off between high-tier service areas.

It is desirable to provide a high-tier PCS communication unit design which capable of performing all of these features by expanding upon low-tier PCS communication unit designs. This high-tier PCS communication unit design attempts to minimize cost, power consumption, and complexity, while maximizing RF spectrum usage per channel and robust design features (e.g., compact and integrated design) for high volume manufacturing of the communication units.

SUMMARY OF THE INVENTION

A radio communication unit for a digital communication system is provided in which an input information signal is protected from transmission errors by forward error correction encoding the information signal. In addition, the communication unit enhances subsequent processing of a transmitted form of the information signal by a hard-limiting receiver by inserting a predetermined synchronization sequence into the information signal. Further, a corresponding radio communication unit is provided which includes a hard limiting mechanism for removing the magnitude of each sample in a group of data samples of a signal received from over a radio communication channel. In addition, weighting coefficients of the hard-limited group of data samples for maximum likelihood decoding and diversity combining are generated by comparing the hard-limited group of data samples to a known predetermined synchronization sequence. Finally, estimated information samples are generated, utilizing the weighting coefficients, by maximum-likelihood decoding the group of data samples.

DETAILED DESCRIPTION

Figure 1:
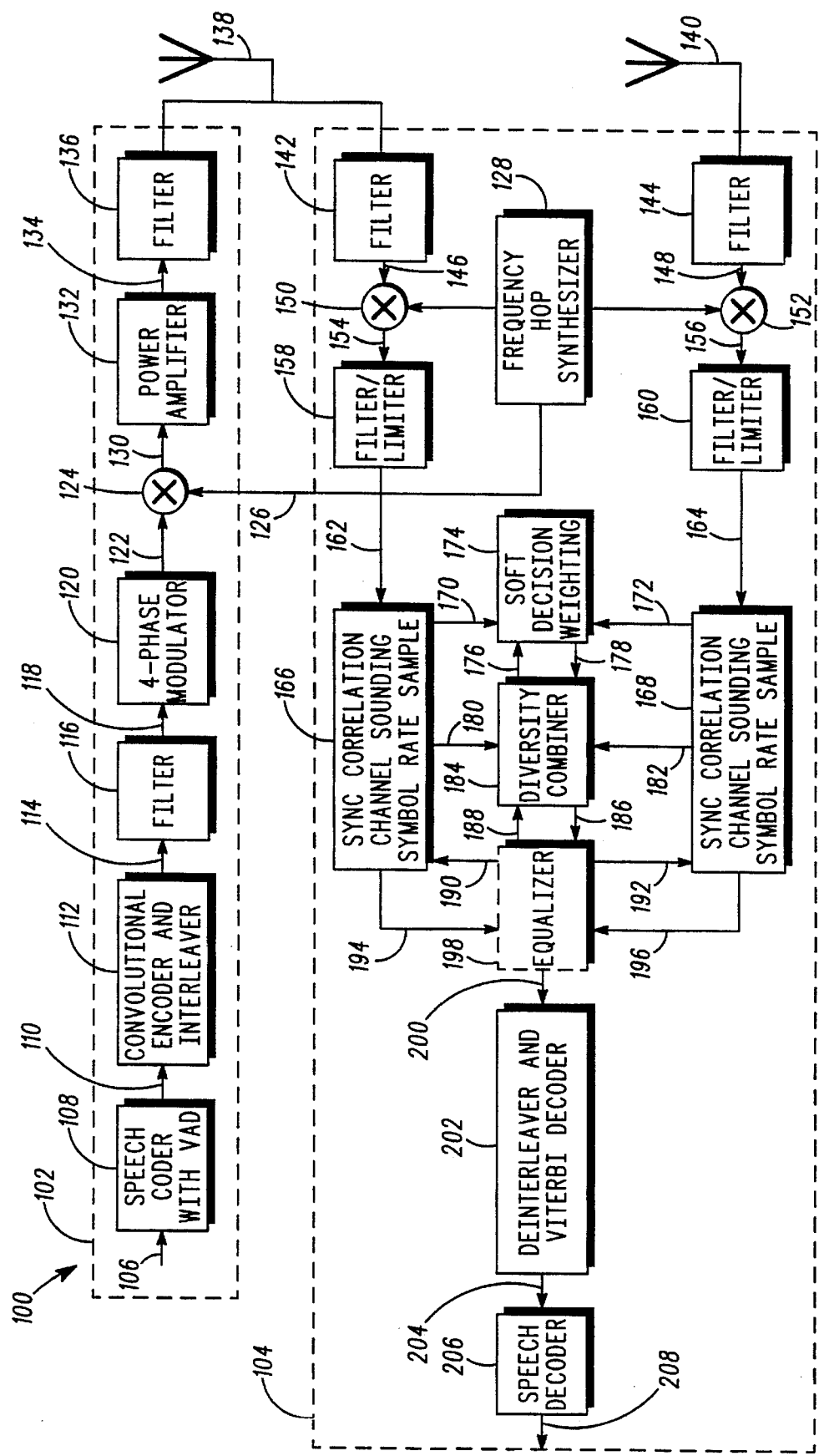
FIG. 1 is a diagram showing a preferred embodiment frequency hopping code division radio communication unit.

Referring now to FIG. 1, a preferred embodiment high-tier PCS communication unit 100 is depicted in block diagram form. As shown, the communication unit 100 may be logically separated into transmitter 102 and receiver 104 function portions. It will be appreciated by those skilled in the art that although these communication functions have been logically separated, the actual implementation of these functions may be accomplished in a variety of different manners including, but not limited to properly programming a digital signal processor (DSP), coupling discrete components together, and using a combination of one or more application specific integrated chips (ASICs). The transmitter portion 102 receives an information signal 106. The information signal 106 may contain data or digitized speech. In the case that the information signal 106 contains digitized speech, the information signal 106 is processed by a speech coder 108 to further encode the digitized speech. Preferably this speech coder employs a voice activity detection (VAD) mechanism to minimize the number of encoded data bits 110 which represent the digitized speech. In the alternative, if the information signal 106 contains data, then the data is passed through the speech coder 108 as the encoded data bits 110.

These encoded data bits are subsequently coded 112 with error detection and error correction codes. In the preferred transmitter portion 102 design, a cyclic redundancy code (CRC) is used for error detection, and a convolutional code is used for forward error correction. The length of the CRC is chosen such that it will reliably detect errors while not becoming computationally burdensome. A similar strategy is followed in choosing the constraint length of the convolutional codes. The complexity of the code may be tailored to the particular hardware implementation. In addition, the high-tier PCS transceiver 100 may optionally utilize non uniform coding rates and selective application of CRC in error detection coding.

After coding, the data bit stream is interleaved 112 to disperse transmission errors of a single frequency hop over a larger period. The high-tier communication unit 100 preferably implements a convolutional interleaver, because this structure results in a dispersion of channel errors which is superior to a block interleaver having twice the amount of interleaving delay. By choosing the vertical dimension of the interleaver to be evenly divisible into the number of interleaved symbols transmitted within a frequency hopping slot, the interleaver has been structured in a manner which will allow synchronization even if a slot is dropped. A known synchronization preamble is added 112 to the interleaver output, and the data bit stream 114 is formatted for time division multiple access (TDMA) transmission. The data bit stream 114 is filtered by a full raised cosine filter 116 with a rolloff factor of 0.5 to meet bandwidth and intersymbol interference requirements.

This filtered data bit stream 118 preferably is subsequently four-phase modulated 120 (i.e., quadrature phase shift keying (QPSK) modulated). The four-phase modulated data bit stream 122 preferably is provided to one input of mixer 124 and a frequency hopping carrier signal 126 is provided to the other input of mixer 124. The frequency hopping carrier signal 126 preferably is generated by a frequency hop synthesizer 128 which generates a carrier signal within a predetermined RF band that hops according to a predetermined pattern (i.e., the frequency hop synthesizer 128 steps through the frequency hopping code). The mixed frequency hopping signal 130 is subsequently amplified by power amplifier 132, supplied 134 to a final stage filter 138 and radiated by antenna 138 over a communication channel.

It will be appreciated by those skilled in the art that the predetermined RF band does not have to be a contiguous frequency band, but rather only need be within a specific range of frequencies to which the chosen frequency synthesizer is capable of operating. In addition, the predetermined pattern (i.e., hopping code) is used to determine the sequence in which a particular communication unit is to hop over the RF band such that the communication unit causes minimal interference to other communication units operating in the same multiple access communication system. Further, it will be appreciated that frequency hop transmission is employed to help mitigate channel impediments such as slow fading. Furthermore, the use of frequency hopping provides another form of diversity to the high-tier communication system and results in the system performance being independent of a users speed (e.g., if a user is traveling in a vehicle).

The receiver portion 104 is designed to efficiently detect and decode the transmitted signal. In view of the fading and multipath channels which are prevalent in mobile communications, a diversity receiver is employed to improve performance. At the receiver 104, each diversity branch (i.e. first branch 138, 142, 146, 150, 154, 158, 162, and 166 as well as second branch 140, 144, 148, 152, 156, 160, 164, and 168) first filters 142, 144 and down converts 150, 152 its respective received signal to a low IF frequency of approximately four megahertz. The frequency hop synthesizer 128 is used within the down conversion process 150, 152 to follow the hopping signal. At this point the signal 154, 156 is hard limited 158, 160. This feature eliminates the need for any form of automatic gain control (AGC) and greatly reduces the required resolution of the analog to digital (A/D) converter and the size of the data paths required in the digital portion of the receiver 104. The algorithms and techniques which allow the use of a hard limiter 158, 160 in a coded system are some of the most innovative and valuable features of the high-tier PCS communication unit 100.

Following the RF and IF processing, the low IF signal is bandpass sampled and converted to the digital domain 158, 160. A relatively low cost A/D converter preferably samples at sixteen times the symbol rate and has only four bits of resolution. Four bit quantization can be used, because the earlier hard limiting 158, 160 has removed the magnitude of the four-phase waveform. At this point, additional filtering is performed by low complexity (e.g., three to five taps) digital bandpass filters to eliminate DC offsets, reduce sampling noise, and separate the inphase and quadrature branches. Each branch may then be decimated 158, 160 by a factor of four effecting a translation to baseband of the hard-limited data samples. The translation to baseband can be readily performed, because the careful selection of a low IF frequency allows the communication unit 100 to utilize the image frequencies.

Now each branch is correlated 166, 168 with the known predetermined synchronization word to determine the optimum sampling point and to perform carrier recovery. Preferably the transmitted signal structure has the synchronization word inserted before the data such that the correlation 166, 168 can be performed with only minimal buffering of the received signal 162, 164. The largest correlation magnitude can serve as an estimate of the channel gain, and the phase of this correlation reflects the conjugate of the phase correction required by the signal 162, 164. Once the largest correlation has been determined, the data samples are further decimated to single sample per symbol. Preferably, the high-tier communication unit 100 actually performs very little processing with oversampled digital data. This allows the receiver portion 104 to minimize power consumption, memory storage and cost.

Next, a signal quality estimate, or weighting parameter 176, 178, is calculated 174 for each branch 170, 172, and the branches 180, 182 are diversity combined 164. Within this process, the scaling 176, 178 required for soft derision decoding 202 is also applied 164 to the signal 180, 182. While it is possible to use a variety of weighting parameters, the best performance will be obtained from a ratio-based statistic. The ability of the high-tier communication unit 100 to compute a ratio-based statistic allows the successful calculation of soft information despite the presence of the hard limiter 158, 160.

Since the ability to calculate 174 accurate weighting parameters 176, 178 via low complexity techniques is crucial to the operation of the high-tier PCS, the derivation of the weighting parameters 176, 178 shall be discussed in detail. In order to establish a framework for this discussion, it is assumed that an arbitrary binary communication channel with time-varying channel gain and noise variance can be modeled as $$r = p_o x_s + n \qquad \text{(eq. 1)}$$

where r is the received signal vector, $p_o$ is the channeled gain matrix, $x_s$ is the transmitted signal vector, and n is the noise vector. Each element of $x_s$, denoted as $x_s(k)$, is an independent identically distributed binary random value taking values $\pm\sqrt{c}$ with equal probability, and each element of n is an independent Gaussian random variable with zero mean and variance $\sigma_n^2(k)$. Thus, the optimum signal weighting for the maximum likelihood decoder 202 may be written as $$\frac{p_0(k)}{\sigma_n^2(k)}. \quad \text{(eq. 2)}$$

Furthermore, this weighting coefficient 176, 178 may serve as the optimal max ratio diversity combining coefficient. Thus, within this framework, the computation of the soft decision weighting and diversity combining coefficients 176, 178 reduces to the calculation of a single coefficient formed from the ratio of the channel gain to the noise variance. For the preferred embodiment high-tier PCS, this basic model is valid with the qualification that the received signal power is approximately constant due to the effects of the hard limiter 158, 160. Since the limiter 158, 160 has an equal effect on the desired signal and the noise, the ratio derived above still serves as a valid estimate of the signal reliability.

At the receiver portion 104, only the received signal r(k) 170, 172 is available. Noting that r(k) has zero mean, it is possible to define the received signal variance as $$\begin{aligned}
\sigma_r^2(k) &= E[r^2(k)] \quad \text{(eq. 3)} \\
&= E[(p_0(k)x_s(k) + n(k))^2] \\
&= E[p_0^2(k)x_s^2(k)] + E[2p_0(k)x_s(k)n(k)] + E[n(k)^2].
\end{aligned}$$

Taking the expectations, recalling that n(k) and $x_s(k)$ are independent and zero mean, yields $$\sigma_r^2(k) = cp_0^2(k) + \sigma_n^2(k). \quad \text{(eq. 4)}$$

If the error signal is defined as $e_s(k)=r(k)-x_s(k)$, then in the same manner as for the received signal variance, the variance of the error signal may be determined as $$\begin{aligned}
\sigma_e^2(k) &= E[e_s^2(k)] \quad \text{(eq. 5)} \\
&= E[(r(k) - x_s(k))^2] \\
&= E[(p_0(k)x_s(k) + n(k) - x_s(k))^2] \\
&= E[(x_s(k)(p_0(k) - 1) + n(k))^2] \\
&= E[x_s^2(k)(p_0(k) - 1)^2 + n^2(k) + 2x_s(k)(p_0(k) - 1)n(k)]
\end{aligned}$$

Taking the expectation of this yields $$= c(p_0(k) - 1)^2 + \sigma_n^2(k).$$

Now a straightforward algebraic manipulation of (eq. 4) and (eq. 5) yields $$p_0(k) = \frac{\sigma_r^2(k) - \sigma_e^2(k) + c}{2c} \quad \text{(eq. 6)}$$

and using this result $$\sigma_n^2(k) = \sigma_r^2(k) - cp_0^2(k). \quad \text{(eq. 7)}$$

While (eq. 6) and (eq. 7) provide a means for calculating the components comprising the weighting parameter, by considering the calculation of the error variance in slightly different manner, a lower complexity method which is ideally suited to the high-tier PCS can be obtained. In this case, the error variance is expanded as $$\begin{aligned}
\sigma_e^2(k) &= E[e_s^2(k)] \quad \text{(eq. 8)} \\
&= E[(r(k) - x_s(k))^2] \\
&= E[r(k) - 2r(k)x_s(k) + x_s^2(k)] \\
&= \sigma_r^2(k) - 2R_{rx}(k,k) + c
\end{aligned}$$

where $R_{rx}(k,k)$, hereafter denoted by $R_{rx}$, represents the cross correlation between the received and transmitted signals. In general, this cross correlation would be of little use since the transmitted signal is not available at the receiver. In high-tier PCS, however, a ten symbol training sequence is preferably incorporated into the beginning of each transmission slot. Since these symbols are known and the length of the sequence is sufficiently long, the correlation may be accurately calculated.

Substituting (eq. 8) into (eq. 6) and simplifying yields $$\begin{aligned}
p_0(k) &= \frac{\sigma_r^2(k) - [\sigma_r^2(k) - 2R_{rx} + c] + c}{2c} \quad \text{(eq. 9)} \\
&= \frac{R_{rx}}{c}.
\end{aligned}$$

This new solution for the channel gain may then be substituted into (eq. 4) to yield $$\sigma_r^2(k) = c(R_{rx}/c)^2 + \sigma_n^2(k). \quad \text{(eq. 10)}$$

Solving (eq. 10) for $\sigma_n^2(k)$ and using (eq. 9), allows the solution of (eq. 2) as $$\frac{p_0(k)}{\sigma_n^2(k)} = \frac{R_{rx}}{c\sigma_r^2(k) - R_{rx}^2}. \quad \text{(eq. 11)}$$

This solution for the diversity combining and soft decision scaling coefficient 176, 178 is well suited for implementation in the high-tier PCS. The cross correlation will routinely be calculated in hardware (e.g., in a prototype system this quantity was calculated by a properly programmed field programmable gate array) as part of the timing and carrier recovery process, and the received signal variance, which is simply the received signal power, is also readily obtainable. While the limiter 158, 160 will normalize the received power to a constant, the digital filters 158, 160 following the analog to digital conversion process will introduce a small data-dependent fluctuation into the variance of the received signal. For this reason, $\sigma_r^2(k)$ is maintained in the denominator of the optimal solution indicated in (eq. 11). In practice, however, this fluctuation is relatively small, and $c\sigma_r^2(k)$ can be replaced by a fixed constant, $\alpha$, with a negligible loss in performance. In this case, the weighting parameter 176, 178 would be represented by $$\frac{p_0(k)}{\sigma_n^2(k)} = \frac{R_{rx}}{\alpha - R_{rx}^2} \quad \text{(eq. 12)}$$

and is a function only of the cross correlation.

It will be appreciated by those skilled in the art that a correlation function has been described above for calculating the weighting coefficients; however, other types of comparison operations could be used such as mean squared error functions to perform this comparison without departing from the scope and spirit of the present invention.

As FIG. 1 indicates, an equalizer 198 is a possible receiver portion 104 option. Such an equalizer 198 would require input 194, 196 from each branch as well as the output 186 of diversity combiner 184. In addition, in order for the equalizer 198 to perform optimally, the equalizer 198 would need to output fine tuning adjustment information to each branch 190, 192 as well as the diversity combiner 188. Subsequently, the equalized combined data sample stream would be output 200 to the deinterleaver 202. While high-tier PCS does not exclude the use of an equalizer 198, preliminary results indicate that its use results in only a small performance improvement relative to a system employing only frequency-hopping and diversity.

Figure 2:
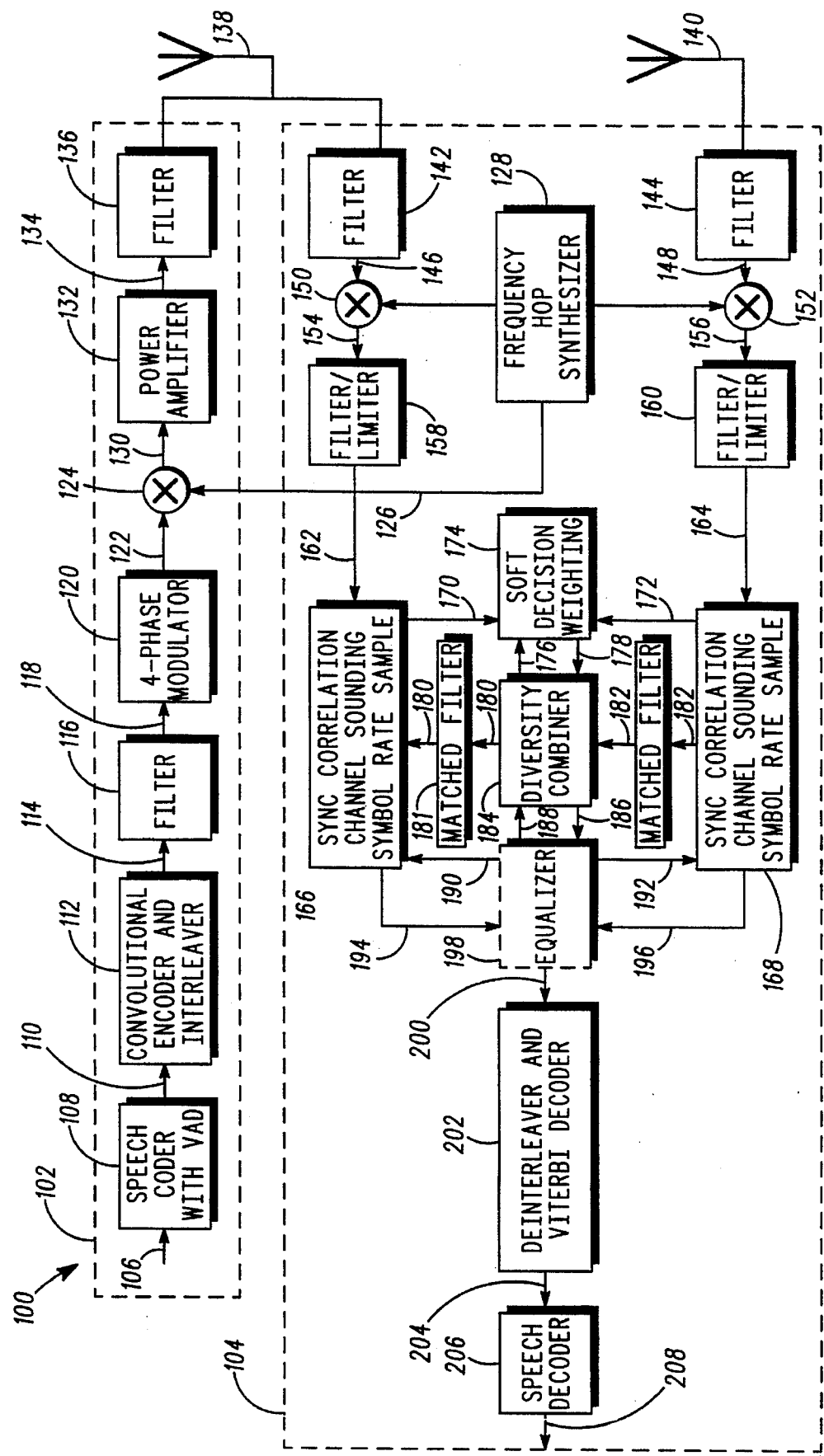
FIG. 2 is a diagram showing an alternative preferred embodiment frequency hopping cede division radio communication unit.

As an alterative to an equalizer 198, the synchronization word may be used to sound the channel thereby allowing the implementation of a matched filter receiver (shown in FIG. 2). On multipath channels, the use of a matched filter 181, 183 may allow the recovery of a significant portion of the energy in the secondary rays without the full complexity required by an equalizer 198. Also, although not indicated in the block diagram, frequency control information will be developed from the diversity combined signal 186 and used to control the frequency hop synthesizer 128 and down conversion process 150, 152.

Following the weighting and combining process 184, the data sample stream 186, 200 is convolutionally deinterleaved 202. The deinterleaver output is Viterbi decoded 202 in an attempt to correct the errors introduced by the communication channel. At this point, the error detection code (e.g., cyclic redundancy check (CRC) code) may optionally be used 202 to check for errors over the span of the code's input. The decoded bits 204, along with the CRC-derived erasure information, preferably is then output as data 208 or input to the speech decoder 206 and then output as voice 208.

Alternatively, the preferred embodiment communication unit 100 shown in FIG. 1 can be described as follows. A radio communication unit 100 for a digital communication system having a transmitter portion 102 is provided. The transmitter portion 102 includes data bit coder 108 for encoding a received information signal 106 into a data bit stream 110. The data bit coder 108 preferably encodes the received information signal 106 into a data bit stream 110 according to a information signal coding algorithm and provides the data bit stream 110 to the error control mechanism 112 for subsequent forward error correction encoding. The information signal coding algorithm consists of:

(1) encoding the information signal 106 with a speech coding algorithm having voice activity detection, when the information signal 106 includes digitized voice signals, and (2) passing the information signal 106 through the data bit coder 108 without additional coding, when the information signal 106 includes data signals.

The data bit stream 110 is input to an error control mechanism 112 which protects the data bit stream 110 from transmission errors by convolutionally encoding and interleaving the data bit stream. This protected data bit stream 110 subsequently has a predetermined synchronization sequence inserted into the error protected data bit stream such that subsequent maximum ratio diversity combining and maximum-likelihood decoding of the transmitted signal by a hard-limiting receiver 104 is enhanced.

The error protected data bit stream 114 is subsequently multi-phase modulated 120 to generate a multi-phase (e.g., four phase) intermediate signal 122 through the use of the error protected data bit stream 118. This the intermediate signal 122 is frequency translated 124 to generating a radio frequency transmission signal 130 by combining the intermediate signal 122 with a radio communication channel selecting signal 126 generated by a frequency hop synthesizer 128. Subsequently, an antenna 138 transmits the radio frequency transmission signal 130 (i.e., after it is amplified 132 and filtered 136) over a radio communication channel.

A radio communication unit 100 for a digital communication system having a receiver portion 104 is provided. A first 138 and second 140 antenna receives a signal from over a radio communication channel. This received signal 146 is demodulated to generating a first 154 and a second 156 group of data samples of the received signal at an intermediate frequency corresponding to the signal received from the first 138 and the second 140 antenna, respectively, through the use of a radio communication channel selecting signal generated by a frequency hop synthesizer 128. These first 154 and second 156 group of data samples are hard limited 158, 160 to remove the magnitude of each sample in the first 154 and the second 156 group of data samples. A subset of the hard-limited data samples of the first 154 and the second 156 group are frequency translated to baseband frequencies 162, 164 by decimating the first 154 and second 156 group of samples in the time domain.

These subsets of the hard-limited data samples of the first 162 and the second 164 group are correlated to a known predetermined synchronization sequence to independently determine an optimal sampling point for the first 162 and second 164 group of data samples to generate symbol rate data samples of the first and second group and to determine channel sounding information.

From the hard-limited symbol rate data samples of the first 170 and the second 172 group weighting coefficient are generated 174 for diversity combining and maximum likelihood decoding. The weighting coefficients 176, 178 ($\lambda$) are preferably generated as a function of the following algorithm:

$$\lambda = \frac{p_0(k)}{\sigma_n^2(k)} = \frac{R_{rx}}{c\sigma_r^2(k) - R_{rx}^2}$$

where, $p_0(k)$=the channel gain estimate, $\sigma_n^2(k)$=the channel noise variance, $R_{rx}$=the cross-correlation between the received data symbols and the known predetermined synchronization sequence wherein the cross-correlation is a pan of the determined channel sounding information, $\sigma_r^2(k)$=the received signal variance, and c=the expectation of the square of the transmitted data bit.

Alternatively, the weighting coefficients 176, 178 may be calculated according to a substantially similar algorithm:

$$\lambda = \frac{p_0(k)}{\sigma_n^2(k)} = \frac{R_{rx}}{\alpha - R_{rx}^2}$$

where, $\alpha$=a constant which approximates the hard-limited received signal variance.

These weighting coefficients 176, 178 are used to scale the first 180 and the second 182 group of symbol rate data samples and to maximum ratio combine the first 180 and the second 182 scaled symbol rate data samples into a stream of combined data samples 186. The stream of combined data samples 186 is deinterleaved and maximum-likelihood decoded 202 into estimated information samples 204.

In summary, the high-tier PCS communication unit 100 offers several improvements over known technology. The techniques developed to allow the use of soft derision decoding and weighted diversity combining on a hard-limited signal offer large performance gains relative to conventional hard decision decoding and selection diversity techniques. Furthermore, the combination of these techniques with the use of a hard limiter and low resolution analog-to-digital converter yields performance which would have previously been unobtainable in a receiver of similar complexity.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A receiver of a radio communication unit for a digital communication system, comprising:

(a) hard limiting means for removing the magnitude of each sample in a group of data samples of a signal received from over a radio communication channel;

(b) weighting coefficient generation means, coupled to the hard limiting means, for generating weighting coefficients of the hard-limited group of data samples for maximum likelihood decoding by comparing the hard-limited group of data samples to a known predetermined synchronization sequence; and (c) error control means, coupled to the hard limiting means and the weighting coefficient means, for maximum-likelihood decoding the group of data samples into estimated information samples by utilizing the weighting coefficients.

2. The receiver of claim 1 further comprising demodulating means, coupled to the hard limiting means, for generating the group of data samples of the received signal at an intermediate frequency corresponding to the signal received on an antenna through the use of a radio communication channel selecting a signal generated by a frequency hop synthesizer.

3. The receiver of claim 1 wherein weighting coefficient generation means comprises (a) means for correlating the hard-limited group of data samples to the known predetermined synchronization sequence to determine channel sounding information; and (b) means for generating weighting coefficients (I) of the hard-limited group of data samples as a function of the following algorithm:

$$\lambda = \frac{p_0(k)}{\sigma_n^2(k)} = \frac{R_{rx}}{c\sigma_r^2(k) - R_{rx}^2}$$

where, $p_o(k)$=a channel gain estimate, $\sigma_n^2(k)$=a channel noise variance, $R_{rx}$=a cross-correlation between the received data symbols and the known predetermined synchronization sequence wherein the cross-correlation is a part of the determined channel sounding information, $\sigma_r^2(k)$=a received signal variance, and c=an expectation of the square of the transmitted data bit.

4. The receiver of claim 3 wherein the weighting coefficient generation means further comprises means for generating the weighting coefficients (I) as a function of the following algorithm:

$$\lambda = \frac{p_0(k)}{\sigma_n^2(k)} = \frac{R_{rx}}{\alpha - R_{rx}^2}$$

where, $p_o(k)$=a channel gain estimate, $\sigma_n^2(k)$=a channel noise variance, $R_{rx}$=a cross-correlation between the received data symbols and the known predetermined synchronization sequence wherein the cross-correlation is a part of the determined channel sounding information, a=a constant which approximates the hard-limited received signal variance.

5. The receiver of claim 1 further comprising a speech decoding means, coupled to the error control means, for converting the estimated information samples into an analog speech signal.

6. A receiver of a radio communication unit for a digital communication system, comprising:

(a) hard limiting means for removing the magnitude of each sample in a first and a second group of data samples of a first and a second signal received from over a radio communication channel, respectively;

(b) weighting coefficient generation means, coupled to the hard limiting means, for generating weighting coefficients of the hard-limited data samples of the first and the second group for maximum likelihood decoding by comparing the hard-limited data samples of the first and the second group to a known predetermined synchronization sequence; and (c) diversity combining means, coupled to the hard limiting means and the weighting coefficient means, for scaling the first and second group of data samples and diversity combining the first and the second scaled data samples into a stream of combined data samples.

7. The receiver of claim 6 further comprising demodulating means, coupled to the hard limiting means, for generating the first and the second group of data samples at an intermediate frequency corresponding to the first and second signal received, respectively, from a first and a second antenna, respectively, through the use of a radio communication channel selecting signal generated by a frequency hop synthesizer.

8. The receiver of claim 6 wherein the weighting coefficient generation means comprises (a) means for correlating the hard-limited data samples of the first and the second group to the known predetermined synchronization sequence to determine channel sounding information; and (b) means for generating weighting coefficients of the hard-limited data samples of the first and the second group as a function of the following algorithm:

$$\lambda = \frac{p_0(k)}{\sigma_n^2(k)} = \frac{R_{rx}}{c\sigma_r^2(k) - R_{rx}^2}$$

where, $p_o(k)$=a channel gain estimate, $\sigma_n^2(k)$=a channel noise variance, $R_{rx}$=a cross-correlation between the received data symbols and the known predetermined synchronization sequence wherein the cross-correlation is a part of the determined channel sounding information, $\sigma_r^2(k)$=a received signal variance, and c=an expectation of the square of the transmitted data bit.

9. The receiver of claim 8 wherein the weighting coefficient generation means further comprises means for generating the weighting coefficients as a function of the following algorithm:

$$\lambda = \frac{p_0(k)}{\sigma_n^2(k)} = \frac{R_{rx}}{\alpha - R_{rx}^2}$$

where, $P_o(k)$=the channel gain estimate, $\sigma_n^2(k)$=the channel noise variance, $R_{rx}$=the cross-correlation between the received data symbols and the known predetermined synchronization sequence wherein the cross-correlation is a part of the determined channel sounding information, a=a constant which approximates the hard-limited received signal variance.

10. The receiver of claim 6 wherein the diversity combining means comprises means for diversity combining the first and the second scaled data samples into a stream of combined data samples by maximum ratio combining the first and the second scaled data samples into a stream of combined data samples.

11. A receiver of a radio communication unit for a digital communication system, comprising:
   (a) hard limiting means for removing the magnitude of each sample in a first and a second group of data samples of a first and a second signal received from over a radio communication channel, respectively; and
   (b) correlation means, coupled to the hard-limited means, for correlating the hard-limited data samples of the first and the second group to a known predetermined synchronization sequence to determine channel sounding information; and
   (c) matched filter means, coupled to the correlation means, for incorporating energy of secondary rays of a multipath channel into the first and the second group of data samples by utilizing the channel sounding information to set filter coefficients of the matched filter means.

12. The receiver of claim 11 further comprising demodulating means, coupled to the hard limiting means, for generating for generating the first and the second group of data samples at an intermediate frequency corresponding to the first and second signal received, respectively, from the first and the second antenna, respectively, through the use of a radio communication channel selecting signal generated by a frequency hop synthesizer.

13. A radio communication unit for a digital communication system, comprising:
   (a) antenna means, comprising a first and a second antenna, for receiving a signal from over a radio communication channel;
   (b) demodulating means, coupled to the antenna means, for generating a first and a second group of data samples of the received signal at an intermediate frequency corresponding to the signal received by the first and the second antenna, respectively, through the use of a radio communication channel selecting signal generated by a frequency hop synthesizer;
   (c) hard limiting means, coupled to the demodulating means, for removing the magnitude of each sample in the first and the second group of data samples;
   (d) frequency translation means, coupled to the limiting means, for translating a subset of the hard-limited data samples of the first and the second group to baseband frequencies by decimating the first and second group of samples in the time domain;
   (e) correlation means, coupled to the frequency translation means, for correlating the subset of hard-limited data samples of the first and the second group to a known predetermined synchronization sequence to independently determine an optimal sampling point for the first and second group of data samples to generate symbol rate data samples of the first and second group and to determine channel sounding information;
   (f) weighting coefficient generation means, coupled to the correlation means, for generating weighting coefficients of the symbol rate data samples of the first and the second group, the weighting coefficients being generated as a function of the following algorithm:

$$\lambda = \frac{p_0(k)}{\sigma_n^2(k)} = \frac{R_{rx}}{c\sigma_r^2(k) - R_{rx}^2}$$

where,
   $p_o(k)$=a channel gain estimate,
   $\sigma_n^2(k)$=a channel noise variance,
   $R_{rx}$=a cross-correlation between the received data symbols and the known predetermined synchronization sequence wherein the cross-correlation is a part of the determined channel sounding information,
   $\sigma_r^2(k)$=a received signal variance, and
   c=an expectation of the square of the transmitted data bit;
   (g) diversity combining means, coupled to the correlation means and the weighting coefficient generation means, for scaling the symbol rate data samples of the first and the second group and maximum ratio combining the first and the second scaled symbol rate data samples into a stream of combined data samples; and
   (h) error control means, coupled to the diversity combining means, for deinterleaving and maximum-likelihood decoding the stream of combined data samples into estimated information samples.

14. The radio communication unit of claim 13 wherein the weighting coefficient generation means generates the weighting coefficients ($\lambda$) as a function of the following algorithm:

$$\lambda = \frac{p_0(k)}{\sigma_n^2(k)} = \frac{R_{rx}}{\alpha - R_{rx}^2}$$

where,
   $p_o(k)$=the channel gain estimate,
   $\sigma_n^2(k)$=the channel noise variance,
   $R_{rx}$=the cross-correlation between the received data symbols and the known predetermined synchronization sequence wherein the cross-correlation is a part of the determined channel sounding information,
   $\alpha$=a constant which approximates the hard-limited received signal variance.

15. The radio communication unit of claim 13 further comprising an equalizer means, coupled to the correlation means, combining means, and error control means, for equalizing the first and second group of data samples by incorporating energy of secondary rays of a multipath channel into the first and the second group of data samples prior to the maximum ratio combination of the first and the second group of symbol rate data samples, and for outputting a combined-equalized stream of data samples to the error control means.

16. The radio communication unit of claim 13 further comprising a speech decoding means, coupled to the error control means, for converting the estimated information samples into an analog speech signal.

17. The radio communication unit of claim 13 further comprising a matched filter means, coupled to the correlation means and the combining means, for incorporating energy of secondary rays of a multipath channel into the first and the second group of data samples by utilizing the channel sounding information to set filter coefficients of the matched filter means, and for outputting first and second group of matched-filtered data samples to the combining means.

* * * * *